Patented Sept. 9, 1952

2,610,154

UNITED STATES PATENT OFFICE 2,610,154

LUMINESCENT ZINC SULFIDE PHOSPHORS AND METHOD OF PREPARING SAME

Joshua R. C. Brown, Jr., Chicago, Ill., assignor to General Electric Company, a corporation of New York No Drawing. Application November 4, 1950, Serial No. 194,190

4 Claims. (Cl. 252—301.6)

This invention relates to a process for the preparation of luminescent materials. More particularly, it relates to the inducing of luminescence in potentially luminescent materials by heating the activated material in contact with its saturated aqueous solution.

It is generally recognized that in order to produce luminescence in potentially luminescent, synthetic materials, it is necessary to develop a well ordered crystal lattice which is characteristic of the base material. It is further recognized that there must be an atomic dispersion of the activating material within the crystal lattice. It is also recognized that in order to realize the maximum luminescence from a given material, it is necessary to produce crystals in a condition close to equilibrium with respect both to crystal structure and activator distribution at some temperature. In the solid state such equilibrium is reached within a reasonable time only at temperatures approaching the melting point of the material. This temperature is reflected in the firing or treating temperatures of about or over 1000° C. which, in general, are necessary to develop crystal luminescence.

It is an object of this invention to provide a method of producing luminescent materials at relatively low temperatures.

It is another object of the present invention to provide a process for producing luminescent materials in aqueous solution.

A further object of the present invention is to provide a method for producing luminescence in potentially luminescent materials in an aqueous medium at temperatures below the critical temperature of water.

Other objects will become apparent and the invention better understood from a consideration of the following description.

It has been found that luminescence may be induced in potentially luminescent material by heating the material along with an activator in an aqueous medium.

More particularly, it has been found that luminescent materials may be prepared by heating in contact with its saturated aqueous solution, a base material of fine crystal size in intimate admixture with activating quantities of activator or activators.

Specifically, it has been found that luminescence may be induced in potentially luminescent material by preparing from the material in fine crystal form and in intimate admixture with activating material a saturated aqueous solution which is heated in contact with the potentially luminescent material in a closed vessel so that crystal growth will occur reversibly.

The principles upon which the present invention is based are briefly as follows, it being understood, of course, that the salutary results obtained speak for themselves and are not to be made irrevocably dependent upon any theory.

In general, potentially luminescent materials are very slightly soluble in water, the solubility of 0.65 mg. per liter of water at 18° C. for zinc sulfide being typical. These materials can, therefore, be precipitated from an aqueous solution by double decomposition reaction of salts containing the component ions. However, such precipitates are invariably nonluminescent even when activator ions are co-precipitated. Reversibility is not approached during the crystal growth of such materials so that a misplaced atom or ion has no opportunity to find its equilibrium position before other atoms or ions deposit around it. The lattice imperfection is, consequently, frozen in the crystal at a temperature far below that at which diffusion within the lattice readily occurs.

In principle, such precipitates undergo changes reversibly on merely standing in water, misplaced atoms or ions redissolving until the equilibrium position is reached. An example of this process is the aging of precipitates. However, in general, the rate of recrystallization at ordinary temperatures is prohibitively slow and even then is likely to be limited to surface layers.

It has been found that the rate of recrystallization may be increased to a practical level by raising the temperature of the aqueous solution to levels up to the critical temperature of water or 374° C.

For best results, the starting materials should be in a finely divided state, particle or Crystallite sizes of the order of 200Å. having been found very desirable. Such finely divided material dissolves more readily with the result that most of the fine crystals, which have a disordered structure, dissolve completely and deposit their material reversibly on a relatively few crystals which, consequently, grow larger. Eventually, there remain only large crystals whose structure is predominantly of material which has recrystallized reversibly on very small disordered cores.

In carrying out the present invention the slightly soluble, potentially luminescent base material is prepared in a fine crystalline size with an intimate admixture of activator as by coprecipitation. The finer and more imperfect the Crystallites, the more complete is the recrystallization of the final material. The base material and activator mixture is then washed and, preferably without drying, mixed with at least a sufficient quantity of water to insure continual contact of the particles of the mixture with the saturated solution. The temperature of the saturated solution is next raised to a point which will produce reversible recrystallization of the particular base material.

As a specific example of the operation of the present invention, a series of experiments carried out with zinc sulfide and zinc-cadmium sulfide are given. It will be realized, of course, that the teachings of this invention are applicable also to the production of luminescent qualities in potentially luminescent materials in general.

Zinc sulfide in the form of crystals of the order of 200Å in size were precipitated from an ammoniacal solution with hydrogen sulfide. When mixed dry with an activator such as 0.01% by weight copper or silver, luminescence was developed only after firing at about 1000° C. for about one hour, sodium chloride being used as a flux. The fired powder particles were predominantly of a size ranging from $5\mu$ to $10\mu$. When cadmium sulfide to the extent of about 10% by weight was mixed with the zinc sulfide the crystal size ranged up to $20\mu$ and over. The large crystal size is attributable to the high temperature at which the zinc and cadmium sulfide have an appreciable vapor pressure that facilitates the growth of large crystals at the expense of small crystals.

When zinc sulfide is precipitated as taught herein along with about 0.01% by weight of copper or silver as activator and heated in water at 300° C. for about 16 hours in a closed vessel, the partial pressure of the water being about 100 atmospheres, there is a marked increase in crystal growth with crystals being produced predominantly in the $1\mu$ to $5\mu$ range. The material luminesces under 3650Å.

A sample of zinc sulfide precipitated as above but with 10% by weight cadmium sulfide and 0.01% by weight copper or silver activator exhibits a similar crystal growth. This material luminesces the characteristic yellow under 3650Å excitation.

Results similar to those above are attained with a treating temperature as low as 250° C.

At lower temperatures, the process is retarded, while raising the temperature to the critical temperature for water accelerates the process.

X-ray study of the treated zinc sulfide material shows a diffraction pattern characteristic of well-developed crystals of cubic zinc sulfide. The material having the 10% CdS constituent also shows the same pattern, slightly displaced, as is to be expected with mixed crystals.

There is provided by this invention a novel process for inducing luminescence in potentially luminescent materials which is particularly characterized by the low temperature of treatment and the reversible recrystallization in aqueous solution of a large number of very fine crystals with intimately admixed activator into a relatively few larger crystals with random distribution of activator within the crystal lattice.

What I claim as new and desire to secure by Letters Patent of the United States is:

1. The method of inducing luminescence in material chosen from the group consisting of zinc sulfide, cadmium sulfide, and mixtures thereof, which comprises forming a saturated solution of the material together with an activator therefor, and heating at temperatures between 250° C. and 374° C. until said material has attained a homogeneous structure.

2. The method of inducing luminescence in zinc sulfide which comprises forming a saturated solution of zinc sulfide together with an activator therefor, and heating at temperatures between 250° C. and 374° C. until said material has attained a homogeneous structure.

3. The method of inducing luminescence in cadmium sulfide which comprises forming a saturated solution of cadmium sulfide together with an activator therefor, and heating at temperatures between 250° C. and 374° C. until said material has attained a homogeneous structure.

4. The method of inducing luminescence in a mixture of cadmium sulfide and zinc sulfide which comprises forming a saturated solution of said materials together with an activator therefor, and heating at temperatures between 250° C. and 374° C. until the mixture has attained a homogeneous structure.

JOSHUA R. C. BROWN, Jr.

REFERENCES CITED

The following references are of record in the file of this patent:

UNITED STATES PATENTS

| Number | Name | Date |
|---|---|---|
| 2,020,918 | Stutz | Nov. 12, 1935 |
| 2,285,464 | Ruthruff | June 9, 1942 |

FOREIGN PATENTS

| Number | Country | Date |
|---|---|---|
| 495,774 | Great Britain | Nov. 18, 1938 |

OTHER REFERENCES

Leverenz, Luminescence of Solids, 1950, pub. John Wiley & Sons, Inc., pgs. 239, 243.